United States Patent
Naef

(10) Patent No.: US 10,587,595 B1
(45) Date of Patent: Mar. 10, 2020

(54) CONTROLLING ACCESS TO CONTENT

(71) Applicant: Acronis International GmbH, Schaffhausen (CH)

(72) Inventor: Frederick Edward Naef, Arlington, VA (US)

(73) Assignee: ACRONIS INTERNATIONAL GMBH, Shaffhausen (CH)

( * ) Notice: Subject to any disclaimer, the term of this patent is extended or adjusted under 35 U.S.C. 154(b) by 47 days.

(21) Appl. No.: 14/984,995

(22) Filed: Dec. 30, 2015

Related U.S. Application Data

(60) Provisional application No. 62/098,032, filed on Dec. 30, 2014.

(51) Int. Cl.
| H04L 29/06 | (2006.01) |
| H04W 48/08 | (2009.01) |
| H04W 4/02 | (2018.01) |
| H04W 12/06 | (2009.01) |
| H04L 9/14 | (2006.01) |
| H04L 9/30 | (2006.01) |
| H04W 4/80 | (2018.01) |

(52) U.S. Cl.
CPC .............. *H04L 63/08* (2013.01); *H04L 9/14* (2013.01); *H04L 9/30* (2013.01); *H04L 63/0428* (2013.01); *H04L 63/06* (2013.01); *H04L 63/20* (2013.01); *H04W 4/02* (2013.01); *H04W 4/80* (2018.02); *H04W 12/06* (2013.01); *H04W 48/08* (2013.01)

(58) Field of Classification Search
CPC .............. H04L 63/08; H04L 9/14; H04L 9/30
See application file for complete search history.

(56) References Cited

U.S. PATENT DOCUMENTS

| 6,986,049 B2 * | 1/2006 | Delany .................... H04L 9/30 709/217 |
| 7,047,380 B2 | 5/2006 | Tormasov et al. |
| 7,246,211 B1 | 7/2007 | Beloussov et al. |
| 7,275,139 B1 | 9/2007 | Tormasov et al. |
| 7,281,104 B1 | 10/2007 | Tsypliaev et al. |
| 7,318,135 B1 | 1/2008 | Tormasov et al. |
| 7,353,355 B1 | 4/2008 | Tormasov et al. |
| 7,366,859 B2 | 4/2008 | Per et al. |
| 7,475,282 B2 | 1/2009 | Tormasov et al. |
| 7,603,533 B1 | 10/2009 | Tsypliaev et al. |
| 7,636,824 B1 | 12/2009 | Tormasov |
| 7,650,473 B1 | 1/2010 | Tormasov et al. |
| 7,721,138 B1 | 5/2010 | Lyadvinsky et al. |
| 7,779,221 B1 | 8/2010 | Tormasov et al. |
| 7,831,789 B1 | 11/2010 | Tsypliaev et al. |

(Continued)

OTHER PUBLICATIONS

NPL Search (Google Scholar) (Year: 2019).*

Primary Examiner — Samson B Lemma
Assistant Examiner — Richard W Cruz-Franqui
(74) Attorney, Agent, or Firm — K&L Gates LLP

(57) ABSTRACT

Methods and systems for controlling access to content are described. The method may include detecting, at a client electronic device, the presence of a beacon device signal emitted from a beacon device. The method may further include determining, based on the beacon device signal, whether the content is accessible from the client electronic device. The method may also include, in response to determining that the content is accessible from the client electronic device, providing access to the content at the client electronic device.

25 Claims, 10 Drawing Sheets

(56) References Cited

U.S. PATENT DOCUMENTS

| | | |
|---|---|---|
| 7,886,120 B1 | 2/2011 | Tormasov |
| 7,895,403 B1 | 2/2011 | Tormasov et al. |
| 7,934,064 B1 | 4/2011 | Per et al. |
| 7,937,612 B1 | 5/2011 | Tormasov et al. |
| 7,949,635 B1 | 5/2011 | Korshunov et al. |
| 7,953,948 B1 | 5/2011 | Dyatlov et al. |
| 7,979,690 B1 | 7/2011 | Dyatlov et al. |
| 8,005,797 B1 | 8/2011 | Chepel et al. |
| 8,051,044 B1 | 11/2011 | Dyatlov et al. |
| 8,069,320 B1 | 11/2011 | Per et al. |
| 8,073,815 B1 | 12/2011 | Korshunov et al. |
| 8,074,035 B1 | 12/2011 | Per et al. |
| 8,145,607 B1 | 3/2012 | Korshunov et al. |
| 8,180,984 B1 | 5/2012 | Per et al. |
| 8,225,133 B1 | 7/2012 | Tormasov et al. |
| 8,261,035 B1 | 9/2012 | Tormasov et al. |
| 8,296,264 B1 | 10/2012 | Dyatlov et al. |
| 8,312,259 B1 | 11/2012 | Dyatlov et al. |
| 8,347,137 B1 | 1/2013 | Chepel et al. |
| 8,484,427 B1 | 7/2013 | Lyadvinsky et al. |
| 8,645,748 B1 | 2/2014 | Chepel et al. |
| 8,732,121 B1 | 5/2014 | Zorin et al. |
| 8,856,927 B1 | 10/2014 | Beloussov et al. |
| 8,996,830 B1 | 3/2015 | Lyadvinsky et al. |
| 2002/0120861 A1* | 8/2002 | Kagiwada ............ G06Q 20/04 726/26 |
| 2003/0103474 A1* | 6/2003 | Kim ................... H04B 1/7103 370/320 |
| 2005/0235148 A1* | 10/2005 | Scheidt ................ G06F 21/31 713/168 |
| 2006/0199538 A1* | 9/2006 | Eisenbach .......... G06F 21/6218 455/41.2 |
| 2006/0225065 A1 | 10/2006 | Chandhok et al. |
| 2007/0185980 A1* | 8/2007 | Abraham ............ H04L 41/0816 709/222 |
| 2010/0011178 A1 | 1/2010 | Feathergill |
| 2010/0042846 A1* | 2/2010 | Trotter ................... G06F 21/31 713/182 |
| 2011/0040974 A1* | 2/2011 | Kaplan ................. H04L 9/3236 713/176 |
| 2012/0178364 A1* | 7/2012 | Dobyns ............... H04M 1/7253 455/41.1 |
| 2013/0258900 A1* | 10/2013 | Kokkinen ............. H04W 92/02 370/254 |
| 2014/0032599 A1* | 1/2014 | Herbach ............... G06F 21/604 707/781 |
| 2014/0049365 A1* | 2/2014 | Ahearn .............. G07C 9/00309 340/5.51 |
| 2014/0282877 A1* | 9/2014 | Mahaffey ........... H04L 63/0853 726/3 |
| 2015/0172920 A1* | 6/2015 | Ben Ayed .......... H04L 63/0853 713/172 |
| 2015/0188758 A1* | 7/2015 | Amidei ............... H04L 41/0896 709/220 |
| 2015/0188949 A1* | 7/2015 | Mahaffey ................ H04L 63/20 726/1 |
| 2015/0222604 A1* | 8/2015 | Ylonen ................. H04L 63/062 713/171 |
| 2015/0371026 A1* | 12/2015 | Gnanasekaran ........ G06F 21/35 726/7 |
| 2016/0072839 A1* | 3/2016 | Mortimore, Jr. ........ H04L 63/20 726/1 |
| 2016/0192195 A1* | 6/2016 | Sudi ...................... H04W 48/16 726/4 |
| 2016/0350535 A1* | 12/2016 | Garcia ................. G06F 21/572 |

\* cited by examiner

CONTROLLING ACCESS TO CONTENT

CROSS-REFERENCE TO RELATED APPLICATIONS

This application claims priority to and the benefit of U.S. Provisional Patent Application No. 62/098,032 filed on Dec. 30, 2014, the disclosure of which is herein incorporated by reference in its entirety.

TECHNICAL FIELD

The technical field may generally relate to controlling access to content at a client electronic device, and in particular, controlling the access based on the presence of various signals.

BACKGROUND

Various content and in particular digital content may be highly sensitive or confidential. Additionally, employers or other organizations may wish to allow at least some users or other personnel to access the content at a client electronic device such as a mobile device (e.g., mobile phone or tablet). However, it may be difficult to control access to the content once the content is deployed to the mobile device. Further, even though it may be desirable to give certain users access to the content, the organization may wish to restrict the access more granularly or based on various factors. For example, it may be desirable to restrict access to such content by one or more of user identity, time, date, location, or content type.

BRIEF SUMMARY

In an embodiment, a method for controlling access to content may include detecting, at a client electronic device, the presence of a beacon device signal emitted from a beacon device. The method may further include determining, based on the beacon device signal, whether the content is accessible from the client electronic device. The method may also include, in response to determining that the content is accessible from the client electronic device, providing access to the content at the client electronic device.

One or more of the following features may be included. Determining whether the content is accessible from the client electronic device may include running a process on the client electronic device to determine whether the content is accessible from the client electronic device based on the beacon device signal. Determining whether the content is accessible from the client electronic device may be further based on a content access policy set at a policy server and wherein a level of access to the content is based upon the content access policy. The method may include receiving a content access policy at the client electronic device. Determining whether the content is accessible from the client electronic device may be further based on the content access policy and the determining may be performed without the client electronic device being in communication with the policy server from which the content access policy was received. Providing access to the content at the client electronic device may include at least one of receiving the content at the client electronic device in response to determining that the content is accessible from the client electronic device and pre-loading the content on the client electronic device prior to determining that the content is accessible and unlocking the content on the client electronic device in response to determining that the content is accessible from the client electronic device.

In one or more implementations, the beacon device may be a Bluetooth Low Energy device. The beacon device signal may include a unique ID which may be detectable at the client electronic device and usable to determine whether the content is accessible from the client electronic device. The method may include, in response to determining that the content is accessible from the client electronic device, decrypting the content such that the content is accessible from the client electronic device. The method may further include, in response to determining that at least one of the beacon device signal and a unique ID is not detectable at the client electronic device, removing access to the content at the client electronic device. The content at the client electronic device may be removed after a delay based on content access policy. The content access policy may include at least one of an indication of one or more users having access to the content based on detecting the presence of a beacon device signal emitted from a particular beacon device, an indication of a level of access to the content for each of the one or more users, and an encryption key usable to access the content.

In one or more implementations, the method may include detecting, at the client electronic device, the presence of another beacon device signal emitted from another beacon device. Providing access to the content at the client electronic device may also be in response to detecting the presence of the other beacon device signal emitted from the other beacon device. The method may further include detecting, at the client electronic device, the presence of a client electronic device signal emitted from another client electronic device. Providing access to the content at the client electronic device may also be in response to detecting the presence of the client electronic device signal emitted from the other client electronic device. The beacon device may be another client electronic device, and the beacon device signal may be a client electronic device signal from the other client electronic device.

In one or more implementations, the method may include determining a first device proximity associated with the client electronic device may be based on the beacon device signal. The method may further include rendering a first portion of the content at the client electronic device based on, at least in part, the first device proximity. The method may also include detecting, at the client electronic device, another beacon device signal emitted from another beacon device. The method may additional include determining a second device proximity associated with the client electronic device based on the other beacon device signal. Moreover, the method may include rendering a second portion of the content at the client electronic device based on the second device proximity. Further, the method may include controlling one or more features available from a client application for accessing the content based on at least one of the proximity of the beacon device to the client electronic device and the content access policy. The method may also include requiring two-factor authentication to verify that a specific user is in a room where the beacon device is present prior to providing access to the content. The method may additionally include handcuffing the content to the client electronic device based on the presence of a beacon device.

In an embodiment, a method for controlling access to content may include receiving, from a policy server, a content access policy at a beacon device. The method may further include emitting, from the beacon device, a beacon device signal representative of at least a portion of the content access policy, wherein the beacon device signal is receivable by a client electronic device and usable by the client electronic device to provide access to the content based on a presence of the beacon device signal.

One or more of the following features may be included. The beacon device signal may include a unique ID emitted based on time and date provisions of the content access policy. Access to the content from the client electronic device may be provided or removed based on a presence of the unique ID. The unique ID may be altered to correspond to particular content accessible by the client electronic device based on the content access policy. The particular content accessible by the client electronic device changes may be based on the altering of the unique ID.

In one or more implementations the method may include storing a private key at the beacon device and a corresponding public key at the policy server. The method may also include transmitting, from the policy server, the public key to the client electronic device. The private key may be used to encrypt information from the beacon device which is used by the client electronic device to confirm the identity of the beacon device to prevent spoofing. The method may also include requiring two-factor authentication to verify that a specific user is in a room where the beacon device is present prior to providing access to the content. The policy server may be linked to a business specific system or server used, in part, to determine the content access policy. The beacon device may be located in a sealed room which prevents the beacon unique ID from leaving the sealed room to prevent spoofing.

In an embodiment, a system for controlling access to content may include at least one beacon device that emits a beacon device signal. The system may further include at least one client electronic device configured to receive the beacon device signal, a content access policy, and the content. The system may also include a content access module running at the at least one client electronic device that determines whether the content is accessible by the at least one client electronic device based on the beacon device signal. The system may additionally include a policy server that provides the content access policy to the at least one client electronic device. Moreover, the system may include a content repository that provides the content to the client electronic device.

The details of one or more implementations are set forth in the accompanying drawings and the description below. Other features and advantages will become apparent from the description, the drawings, and the claims.

DETAILED DESCRIPTION

Overview

Figure 1:
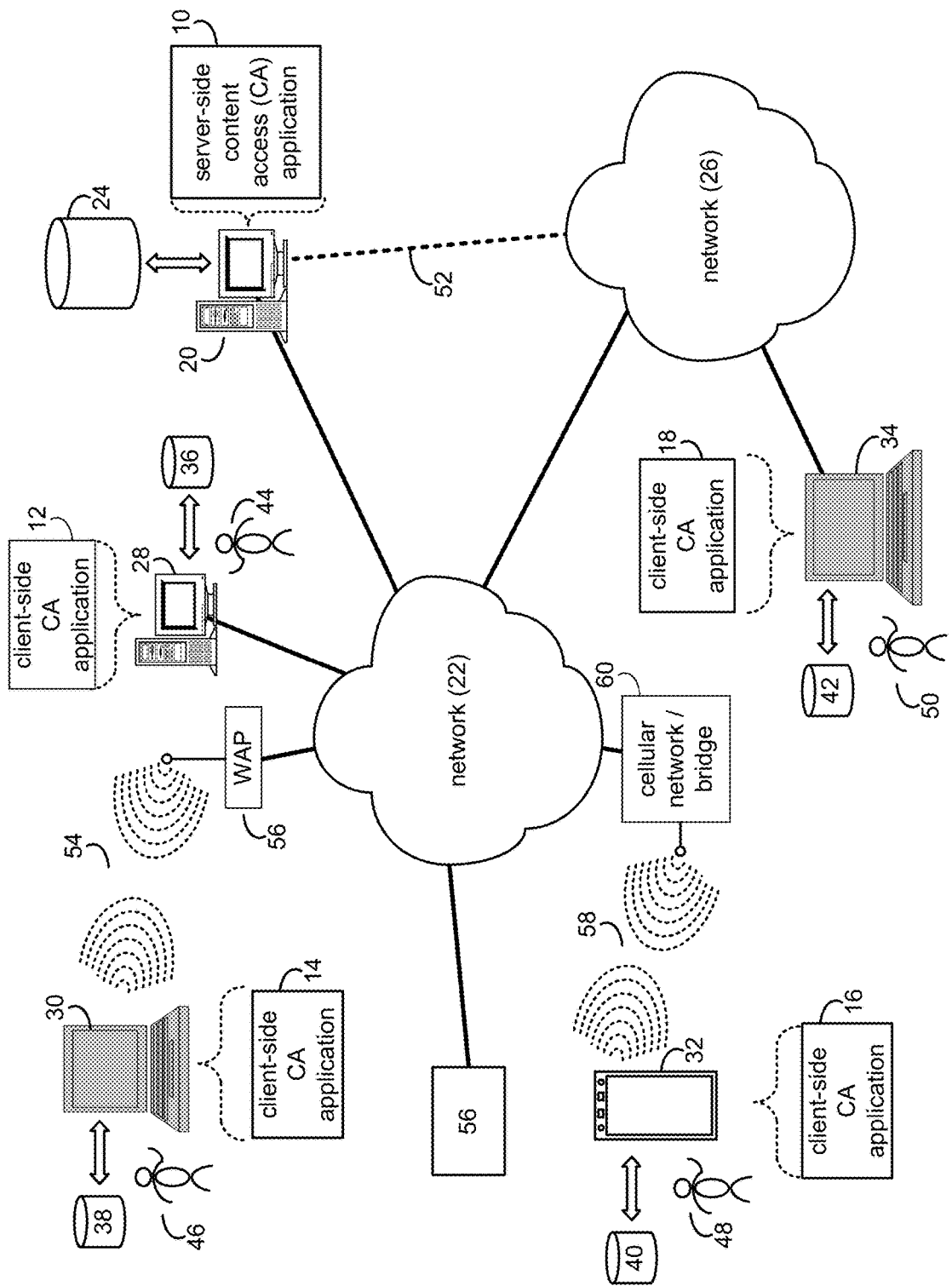
FIG. 1 depicts an example system that can execute implementations of the present disclosure.

In part, the disclosure relates to various devices and systems to address content control and access based on proximity to a beacon. In one embodiment, a vehicle such as a plane or car that has specialized repair or installation instructions or other vehicle specific content can be matched to an end user via a beacon. For example, a beacon in a vehicle can interact with a mobile device such that the mobile device brings up install or repair schematics for that vehicle when in proximity to the beacon. This can be useful to manage large amounts of complex datasets that vary in a given environment such as a repair facility having multiple vehicles requiring different tools and instructions. The use of beacons can be used to track and control the information such that it is presented in a vehicle specific manner using a mobile device. Various other use cases can be implemented using beacons and other devices as described herein.

In an embodiment, the term "beacon" or "beacon device" may be used to generally refer to an active or passive sensor, signal generator, receiver, transmitter, transceiver, software triggering device, or trigger suitable for use with implementations described herein. Proximity or other categories of sensors may provide the ability to measure proximity to the sensors at a close distance, and determine whether the sensors are near, and when a plurality of proximity or other categories of sensors are available, which beacon is closest to the receiver (i.e., of a mobile device). In an embodiment, the beacons may include Low Energy BlueTooth (BLE) capable transmitters such as Apple "iBeacons" or others.

Content may be encrypted and/or tagged to be available in the presence of one or more specific beacon device signatures or signals. The content may be distributed to one or more devices. The content may be made available to users in a specific location where one or more beacons devices are enabled. The content may then be unencrypted or otherwise provided and users may access the content via one or more client electronic devices (e.g., mobile devices). When access to the content needs to be removed, the one or more beacon devices may be disabled (i.e., transmission is turned off or power is cut) and the content is no longer available to the client electronic devices, due to the absence or the one or more specific beacon device signatures or signals.

In an implementation, the content may also no longer be available if the user leaves the room (with his/her mobile device) where the one or more beacon devices are present. In other implementations, the room may be shielded so that beacon device signals cannot escape from the room, which may ensure that the content is re-encrypted when users leave and may prevent capturing of beacon device identifiers to enable spoofing.

The techniques and features described herein may be applied in various real world situations. For example, the systems described herein may be configured in college classrooms or test environments where tests are pre-distributed to client electronic devices. The test proctor may enable the beacon devices at the proper time of the test, making the relevant test content available. At the end of the test the beacon devices may be are disabled and the content is no longer accessible on the client electronic devices. In other implementations the systems described herein may be used in board meetings, military briefings, intellectual property or other litigation reviews by third parties, or other situations where content access is required in a controlled environment.

While some methods and systems for controlling access to content may be implemented by providing access to the content in response to detecting a beacon signal at a client electronic device or mobile device, other methods and systems for access control and regulation using one or more sensors (which may be beacons) or computing devices are described. The method may include initiating a data exchange with a sensor such as a beacon and a mobile device and validating software on the mobile device. Access to various types of content can be regulated based upon the presence or absence of a data connection between the one or more sensors and a server or the mobile device.

In part, the disclosure relates to a method of controlling access to content in response to receiving a beacon device signal at user device or client electronic device (e.g., mobile phone or tablet). The method may include validating software on the user device and granting access to various types of content based upon the presence or absence of communication between the beacon device and the user device. In one embodiment, the user device is a mobile device such as a smart phone or watch.

In part, the disclosure also relates to a content access system including one or more beacon devices, an authentication subsystem comprising one or more software components, an access control subsystem comprising a tracker component. The disclosure also relates to a user device, and a content repository in electronic communication with the access control subsystem wherein access to the repository is granted or prevented based upon one or more conditions or communication signals generated at least in part by or based upon an output of one or more of the beacon devices.

In the context of a mobile or desktop application that provides secure, encrypted protection of content such as Acronis Access, the management of access to the encrypted content can be facilitated by proximity or other categories of sensors in a number of novel ways described herein. The techniques and features described herein may apply to access to applications or proper functioning of features within applications, not just access to content. A rules engine and a content repository may be used along with one or more authentication systems in an embodiment.

Referring to FIG. 1, there is shown a server-side content access (CA) application 10 and client-side CA applications 12, 14, 16, and 18. Server application 10 and/or one or more of client applications 12, 14, 16, and/or 18 may execute one or more processes configured to carry out one or more of the features described herein. Server application 10 may be referred to as a process configured to carry out one or more of the features described herein, such as content access process 10. Further, one or more of client applications 12, 14, 16, and 18 may be referred to as a process configured to carry out one or more of the features described herein, such as content access processes 12, 14, 16, and/or 18.

As will be discussed below and referring now to FIG. 2, content access process or application 12 may detect 200, at a client electronic device, the presence of a beacon device signal emitted from a beacon device. Content access process 12 may also determine 202, based on the beacon device signal, whether the content is accessible from the client electronic device. Further, content access process 12 may, in response to determining that the content is accessible from the client electronic device, provide 204 access to the content at the client electronic device.

The content access process may be a server-side process (e.g., server-side content access process 10), a client-side process (e.g., client-side content access process 12, client-side content access process 14, client-side content access process 16, or client-side content access process 18), or a hybrid server-side/client-side process (e.g., a combination of server-side content access process 10 and one or more of client-side content access processes 12, 14, 16, 18).

System Overview

Referring to FIG. 1, server-side content access process 10 may reside on and may be executed by server computer 20, which may be in communication with network 22 (e.g., the Internet or a local area network). Examples of server computer 20 may include, but are not limited to: a personal computer, a server computer, a series of server computers, a mini computer, and/or a mainframe computer. The server computer 20 may be a distributed system and the operations of server computer 20 may execute on one or more processors, simultaneously and/or serially. For example, server computer 20 may be a symbolic representation of a content management application or platform including a content server or repository, a policy engine or server, and other engines or servers as may be discussed herein. Server computer 20 may execute one or more operating systems, examples of which may include but are not limited to: Microsoft Windows Server™; Novell Netware™; Redhat Linux™, Unix, or a custom operating system, for example.

The instruction sets and subroutines of server-side content access process 10, which may be stored on storage device 24 coupled to server computer 20, may be executed by one or more processors (not shown) and one or more memory architectures (not shown) incorporated into server computer 20. Storage device 24 may include but is not limited to: a hard disk drive; a tape drive; an optical drive; a solid state storage device; a RAID array; a random access memory (RAM); and a read-only memory (ROM).

Server computer 20 may execute a web server application that allows for access to server computer 20 (via network 22) using one or more protocols, examples of which may include but are not limited to HTTP (i.e., HyperText Transfer Protocol). Network 22 may be in communication with one or more secondary networks (e.g., network 26), examples of which may include but are not limited to: a local area network; a wide area network; or an intranet, for example.

Client-side content access processes 12, 14, 16, 18 may reside on and may be executed by client electronic devices 28, 30, 32, and/or 34 (respectively), examples of which may include but are not limited to personal computer 28, a television with one or more processors embedded therein or coupled thereto (not shown), laptop computer 30, data-enabled mobile telephone 32, notebook computer 34, a tablet (not shown), and a personal digital assistant (not shown), or other desktop or mobile devices, for example. Client electronic devices 28, 30, 32, and/or 34 may (or may not) each be in communication with network 22 and/or network 26 and may each execute an operating system, examples of which may include but are not limited to Apple iOS™, Microsoft Windows™, Android™, Redhat Linux™, or a custom operating system.

The instruction sets and subroutines of client-side content access processes 12, 14, 16, 18, which may be stored on storage devices 36, 38, 40, 42 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Storage devices 36, 38, 40, 42 may include but are not limited to: hard disk drives; tape drives; optical drives; solid state storage devices; RAID arrays; random access memories (RAM); read-only memories (ROM); compact flash (CF) storage devices; secure digital (SD) storage devices; and memory stick storage devices.

Client-side content access processes 12, 14, 16, 18 and/or server-side content access process 10 may be processes that run within (i.e., are part of) a content management application or platform. Alternatively, client-side content access processes 12, 14, 16, 18 and/or server-side content access process 10 may be stand-alone applications that work in conjunction with the content management application or platform. One or more of client-side content access processes 12, 14, 16, 18 and server-side content access process 10 may interface with each other (via network 22 and/or network 26).

Users 44, 46, 48, 50 may (or may not) access server-side content access process 10 directly through the device on which the client-side content access process (e.g., client-side content access processes 12, 14, 16, 18) is executed, namely client electronic devices 28, 30, 32, 34, for example. Users 44, 46, 48, 50 may (or may not) access server-side content access process 10 directly through network 22 and/or through secondary network 26. Further, server computer 20 (i.e., the computer that executes server-side content access process 10) may be in communication with network 22 through secondary network 26, as illustrated with phantom link line 52.

The various client electronic devices may (or may not) be directly or indirectly coupled to network 22 (or network 26). For example, personal computer 28 is shown directly coupled to network 22 via a hardwired network connection. Further, notebook computer 34 is shown directly coupled to network 26 via a hardwired network connection. Laptop computer 30 is shown wirelessly coupled to network 22 via wireless communication channel 54 established between laptop computer 30 and wireless access point (i.e., WAP) 56, which is shown directly coupled to network 22. WAP 56 may be, for example, an IEEE 802.11a, 802.11b, 802.11g, 802.11n, Wi-Fi, and/or Bluetooth device that is capable of establishing a wireless communication channel 54 between laptop computer 30 and WAP 56. Data-enabled mobile telephone 32 is shown wirelessly coupled to network 22 via wireless communication channel 58 established between data-enabled mobile telephone 32 and cellular network/bridge 60, which is shown directly coupled to network 22.

All of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth (e.g., Low Energy Bluetooth (BLE)) is a telecommunications industry specification that allows e.g., mobile phones, tablets, computers, beacon devices and personal digital assistants to be interconnected using a short-range wireless connection.

Content Access Process

For the following discussion, client-side content access process 14 will be described for illustrative purposes however one or more of client electronic devices 28, 30, 32, and 34 may run a client-side content access application (e.g., 12, 14, 16, 18) to carry out some or all of the techniques and features described here. It should be noted that server-side content access process 10 may interact with client-side content access process 14 (and/or 12, 16, 18) and may be executed within one or more applications that allow for communication with client-side content access process 14 (and/or 12, 16, 18). However, this is not intended to be a limitation of this disclosure, as other configurations are possible (e.g., stand-alone, client-side content access processes and/or stand-alone server-side content access processes). For example, some implementations may include server-side content access process 10 in place of or in addition to one or more of client-side content access processes 12, 14, 16, and 18. Content access process 14, for example, may include a software component, executable code, function, subroutine, or other set of instructions designed to carry out one or more operations for content access.

As discussed above, general content access may be driven by the presence of a beacon device signal. The beacon device signal may include a unique ID which is detectable at a client electronic device and usable to determine whether the content is accessible from the client electronic device. In other implementations, not only is content access driven by the beacon device signal, but access to specific documents or portions of a document may be enabled based on the beacon device signal. In the presence of the beacon device signal, a client electronic device may automatically bring up specific sections of a document. Further, in other implementations, the content may be wiped or deleted from the client electronic device when the beacon device signal is lost, not detected, or no longer present (e.g., the content may be "handcuffed" to a physical item).

Figure 3:
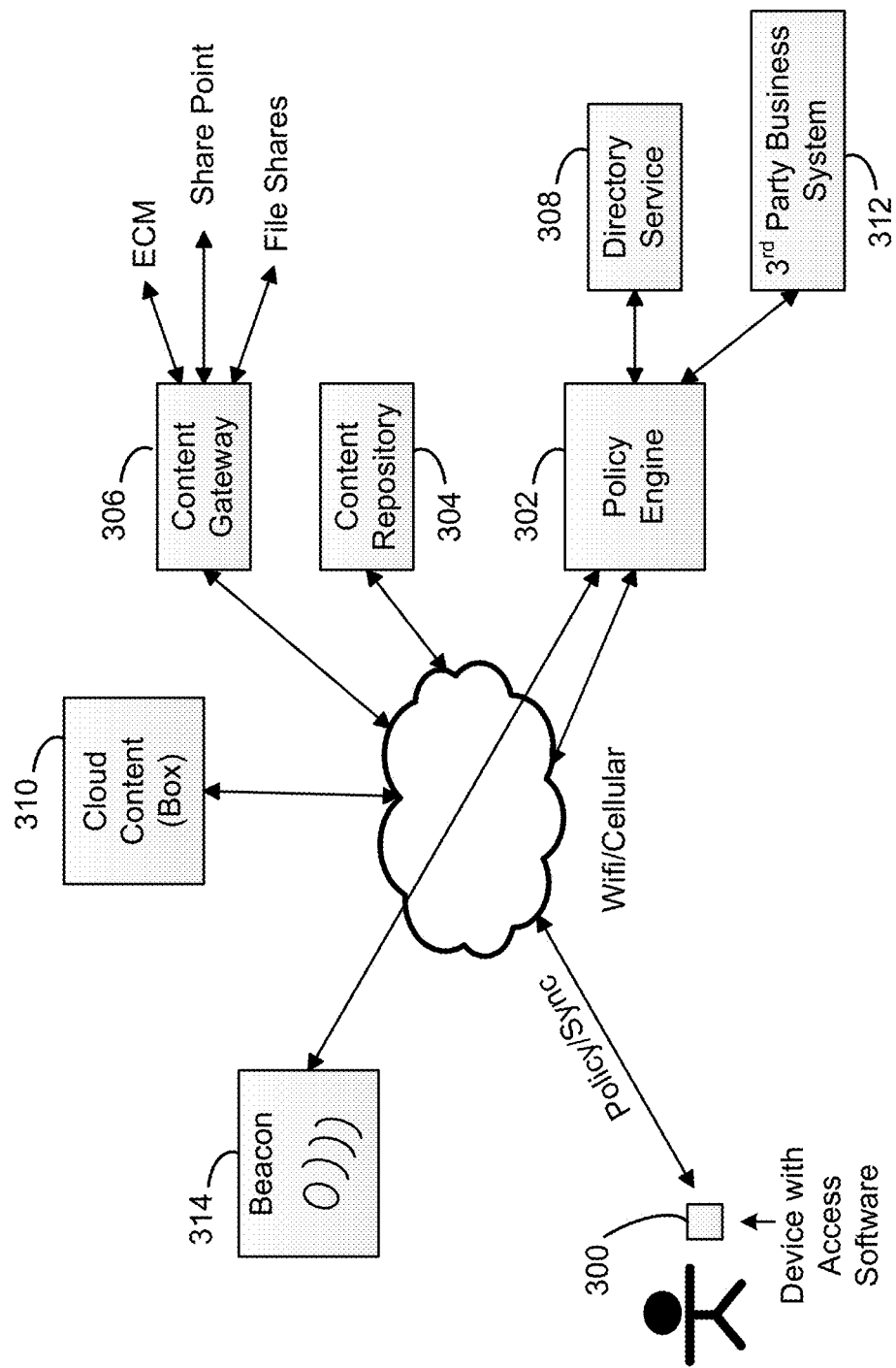
FIG. 3 also depicts an example architecture in accordance with an embodiment of the present disclosure.
Figure 9:
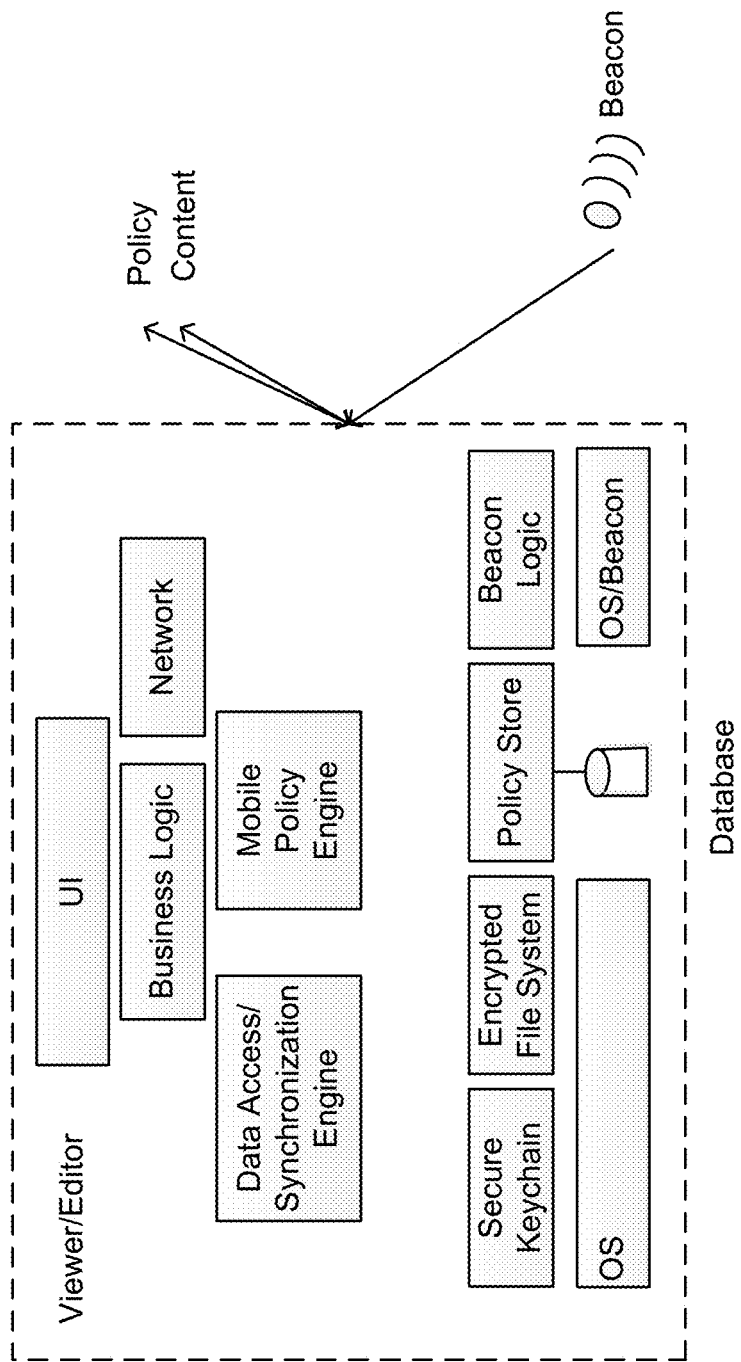
FIG. 9 is an example client side architecture associated with the present disclosure.

Referring now to FIG. 3, an example architecture in accordance with one or more embodiments of the present disclosure is shown. The architecture may include one or more client electronic device such as mobile device 300, which may be a mobile phone, tablet, laptop, watch or other mobile device or even one or more desktop computers. The mobile device may run software ("content access software" or "access software") which may provide access to content. In an implementation, the access software may be part of the operating software (OS) or software development kit (SDK) or may be embedded in other applications (i.e., not necessarily a stand alone application). Referring now to FIG. 9, an example client electronic device or mobile device architecture is shown.

In an embodiment, content access may be provided via WiFi or cellular connections (directly) as shown in FIG. 3 or content may be synced to the mobile device for offline use over a network. In an embodiment, content may be "preloaded" or "side-loaded" when the mobile device is setup by copying content over a cable. An architecture such as the one shown in FIG. 3 may allow content access control to be provided. For example, content on the mobile device may be encrypted to prevent access without meeting certain conditions. Alternatively, the mobile device may not allow viewing of content unless policy conditions are met. Content policy may control whether content may be accessed. For example access may be governed by a content access policy, which may set by central server (e.g., policy engine 302 or a policy server).

In various implementations, the content access policy may include an indication of one or more users having access to the content based on detecting the presence of a beacon device signal emitted from a particular beacon device. The content access policy may also include an indication of a level of access to the content for each of the one or more users. For example, one or more content viewing, editing, or manipulation policies may be implemented. For example, when it is determined that certain content may be accessed, a user take some action on the content using the mobile device (e.g., mobile device 300), such as view it, print it, manipulate it, edit it, etc. (i.e., levels of access), using one or more tools which may be built into the mobile device (either part of the content access software, or other software on the device). These actions may include creating new content (e.g., being able to take photos and submit them to the content repository) or some other workflow (e.g., taking a test). Actions the user may take may be determined and/or limited by the content access policy. The content access policy may also include an encryption key usable to access the content.

Figure 10:
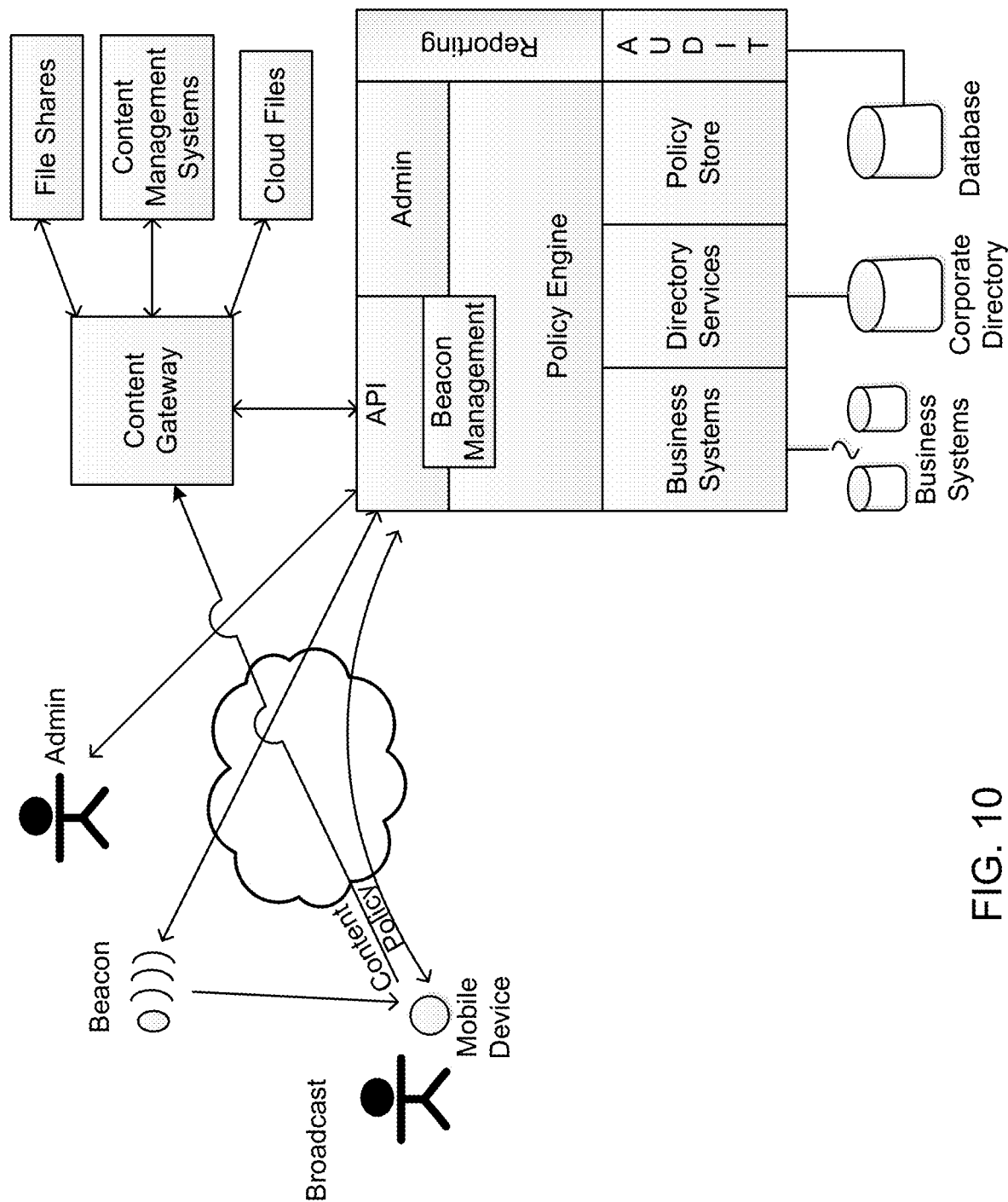
FIG. 10 is an example content management platform associated with the present disclosure.

A content repository 304 may be included or accessed. Content at the repository may be accessed at the mobile device. Content repository 304 may be a repository of data by itself, or a front end gateway (e.g., content gateway 306) to existing content repositories like file shares, SharePoint, or other enterprise content management (ECM) systems may be included or accessed. In an embodiment, a direct link to a 3rd party content repository (e.g., cloud content 310) including cloud repositories such as Dropbox or Box may be included or accessed. Referring now to FIG. 10, an example content management platform is shown.

Policy engine 302 may include server software or functionality which may maintain a set of policy rules (i.e., a content access policy). The policy rules may be evaluated for a user or group of users to define what content particular users or groups or users have access to, what actions the users are allowed to take with the content, and whether/how the content is synced to the users' respective mobile devices. The policy engine may 302 may interact with other systems to determine the proper policy. For example, a directory service component (e.g., directory service 308) may be a central location for tracking all users in an organization, or tracking security groups which include users. In addition or alternatively the policy engine may link to a business specific system (e.g., business system 312) to determine policy (e.g., for a classroom to determine which students are involved with a class or need to take a particular test, etc.).

In an embodiment, the effective content access policy for a given user or mobile device may be pushed to the mobile device initially, when enrolling with the policy (e.g., setting up the content access software). The content access policy may also be received at the beacon device. The content access policy on the device may be updated periodically to reflect further changes in policy. In an embodiment, the techniques and features described herein enable the content access policy to be evaluated by the mobile device even when it cannot connect to the server (e.g., policy engine or server).

One or more beacons (e.g., beacon device 314) may be included. A beacon may be a micro-location/proximity sensor including but not limited to Bluetooth Low Energy (BLE) devices such as Apple iBeacons or near-field communication devices. A mobile device may compare the signal strength of beacon devices to measure proximity to the receivers or sensors (e.g., of a mobile device) at a close distance and determine whether the receivers or sensors are near one or more beacon devices, when a plurality of beacon devices are available, and which beacon device is closest to the receiver or sensor (e.g., of a mobile device). Beacons may be passive (emitting a signal only) or interactive (e.g., responsive to commands). Beacons may also be programmed to alter their signals by physically connecting the beacons to a device for programming, or via an over-the-air method of modifying their settings (e.g., via a WiFi network). In an implementation, a beacon may be any device capable of transmitting the unique information needed to enforce a content access policy.

The beacon device may emit a beacon device signal representative of at least a portion of the content access policy. The beacon device signal may be receivable by a client electronic device and usable by the client electronic device to provide access to the content based on a presence of the beacon device signal. The beacon device signal further may include a unique ID emitted based on time and date provisions of the content access policy. Access to the content from the client electronic device may be provided or removed based on a presence of the unique ID. The unique ID may be altered to correspond to particular content accessible by the client electronic device based on the content access policy. The particular content accessible by the client electronic device may change based on the altering of the unique ID.

Figure 4:
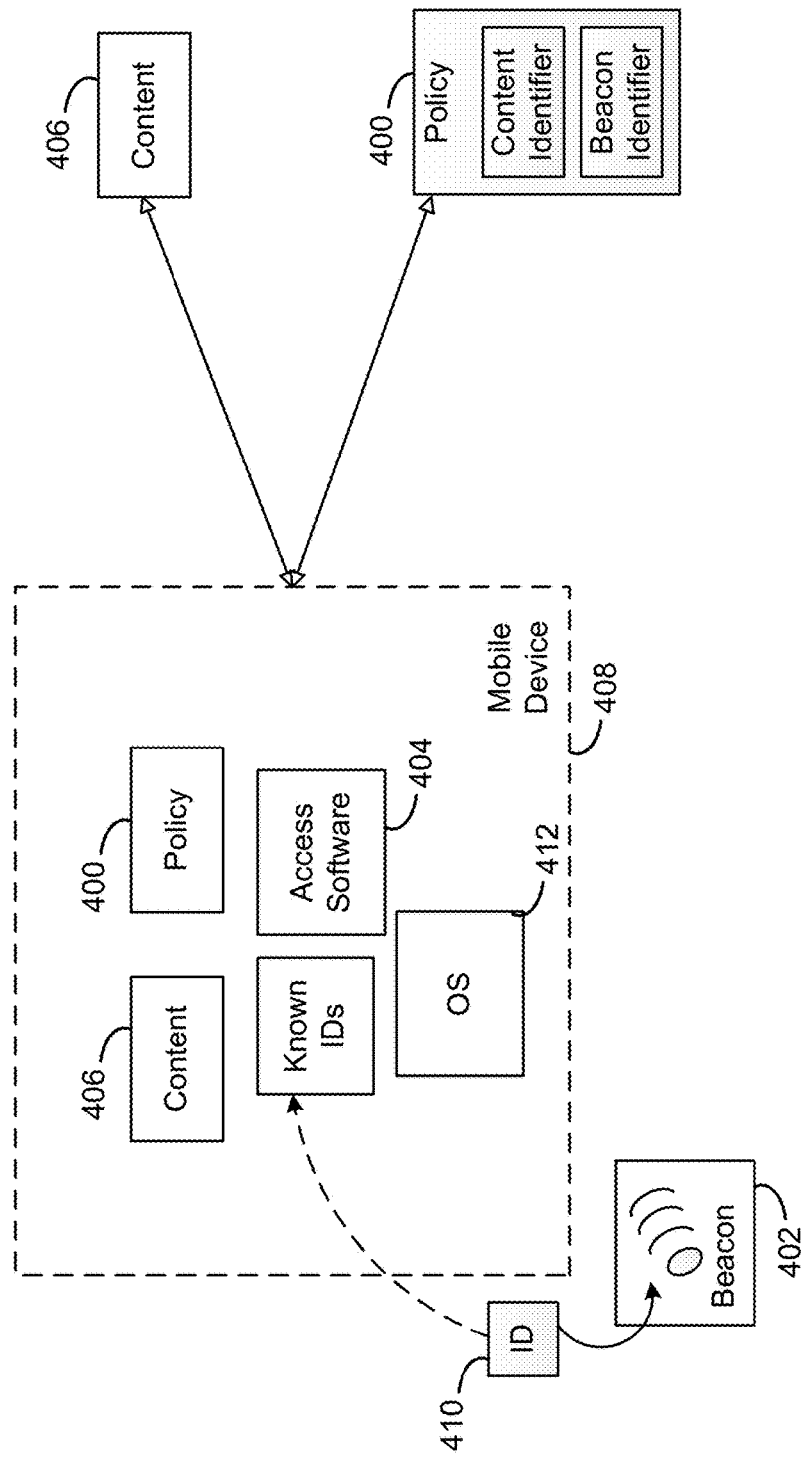
FIG. 4 is an example workflow for controlling access to content in accordance with the present disclosure.

Referring now to FIG. 4, an example workflow in accordance with the present disclosure is shown. A policy (e.g., policy 400) may be defined. The policy may be defined at, for example the policy engine. Policy 400 may be a content access policy and may be set 208 at a policy server and a level of access to the content may based upon the content access policy. The policy may include a list of beacons which are available (e.g., beacon 402). The beacons may be located in various areas such as classrooms or maintenance facilities. Depending on how the beacons are programmed, workflows may be different. The workflow shown in FIG. 4 is provided for illustrative purposes only, and is not intended to limit the present disclosure.

Figure 2:
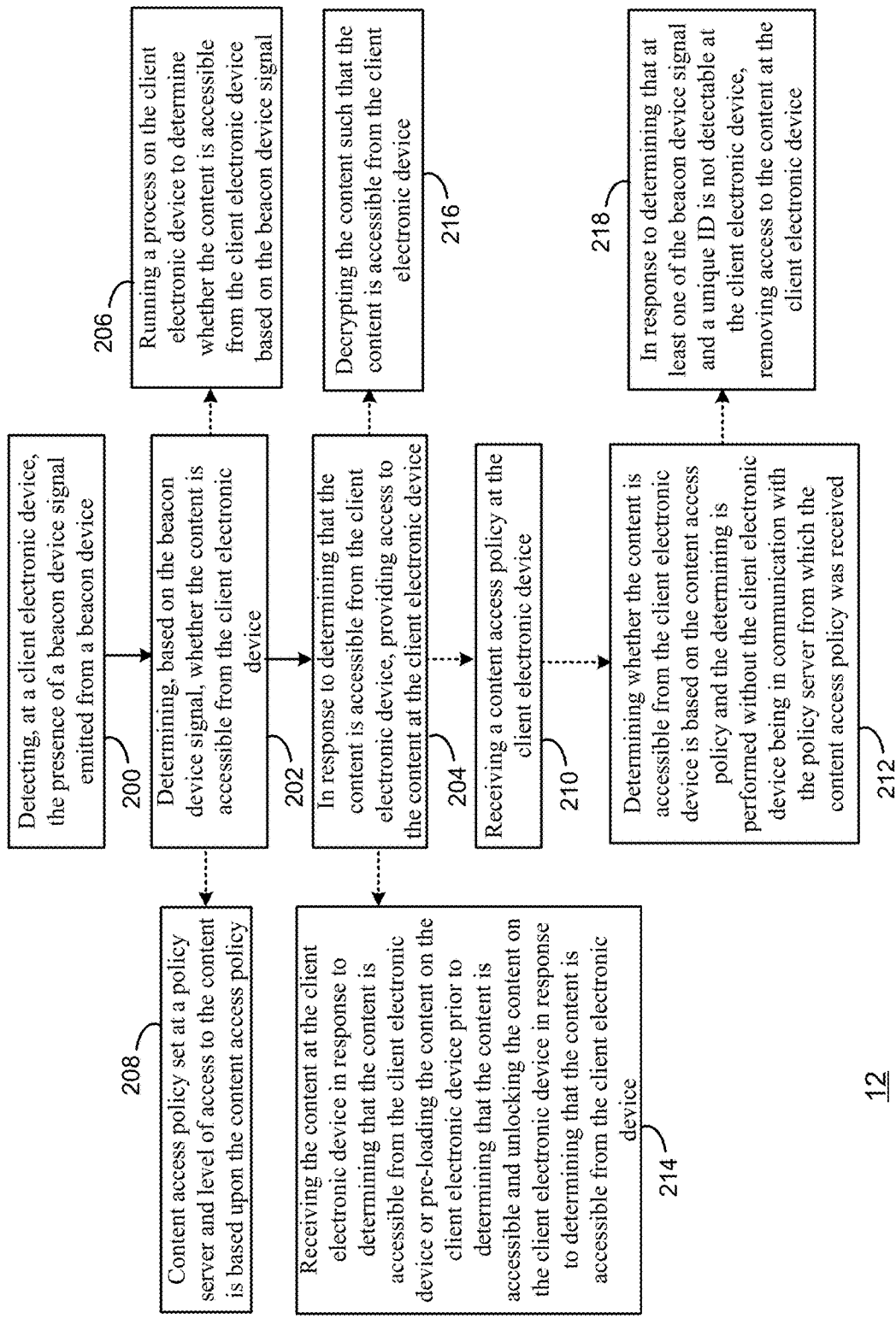
FIG. 2 is a flowchart illustrating an example process for controlling access to content in accordance with the present disclosure.

Referring now also to FIG. 2, content access process 12 may detect 200 the presence of a beacon device signal emitted from a beacon device. In an embodiment, the content access process 12 may be part of content access software referred to herein and may run 206 a process on the client electronic device to determine whether the content is accessible from the client electronic device based on the beacon device signal. Content access process 12 may detect the beacon device signal or beacon unique ID at a client electronic device or mobile device via a receiver or transceiver of the client electronic device or mobile device. The receiver or transceiver may be a Low Energy Bluetooth receiver or transceiver or other receiver or transceiver capable of receiving a signal of whatever particular protocol the beacon device uses. In an embodiment one or more beacons may emit a unique ID that which may be detected or picked up by the mobile device (e.g., mobile device 408) and or content access software (e.g., access software 404) running on the mobile device. Content access policy rules may be defined (e.g., policy 400) and may specify which users/groups of users have access to particular content (e.g., content 406) when the user or a mobile device associated with the user is in the presence of a certain beacon, and may also define which actions the user may take with respect to the particular content.

Content access process 12 may determine 202, based on the beacon device signal, whether the content is accessible from the client electronic device or mobile device. Content access process 12 may use policy rules which may be distributed to the mobile device (i.e., policy 400 shown in mobile device 408) and may be enforced at the mobile device. Content access process 12 may receive 210 a content access policy at the client electronic device. As a result, content access process 12 may determine whether the content is accessible from the client electronic device is based on the content access policy and the determining may be performed 212 without the client electronic device being in communication with the policy server from which the content access policy was received.

In response to determining that the content is accessible from the client electronic device, content access process 12 may provide 204 access to the content at the client electronic device. Based on policy 400, content 406 may be distributed to mobile device 408 either over a wired or tethered connection, via side-loading, or over WiFi or cellular sync. Content access process 12 may receive 214 the content at the client electronic device in response to determining that the content is accessible from the client electronic device. In an implementation, the content may be pre-loaded on the client electronic device prior to determining that the content is accessible and the content may be unlocked the on the client electronic device in response to determining that the content is accessible from the client electronic device. In addition or in the alternative, the content location may be stored in the mobile device and may be accessed directly over the network when the policy allows the content to be viewed at the mobile device, and content may not be pre-stored on the mobile device. In an implementation, content access process 12 may decrypt 216 the content such that the content is accessible from the client electronic device.

In an embodiment, content 406 may or may not be encrypted, however access to content 406 will be governed by the policy 400. When the user interacts with the mobile device the user may trigger the access software 404 to request access to specific content such as content 406.

Based on the policy 400, if access to content 406 requires the presence of a beacon 402 with a specific unique ID (e.g., ID 410), then access software 404 may search for the presence of a beacon signal with the unique ID. Access software 404 will generally only enable access to or decrypt content 406 if the beacon signal is present. In an embodiment, encryption keys may be delivered to the mobile device as part of the policy and the unique ID from the beacon may be used to determine its presence to enable access to content 406. In addition or alternatively, the access software may be registered with the operating system (e.g., OS 412) looking for specific beacon unique ID. Thus, as soon a unique ID is detected, a signal may be passed to the access software to alert it that the beacon is present, and then the access software can invoke a process based on the policy rules.

Figure 5:
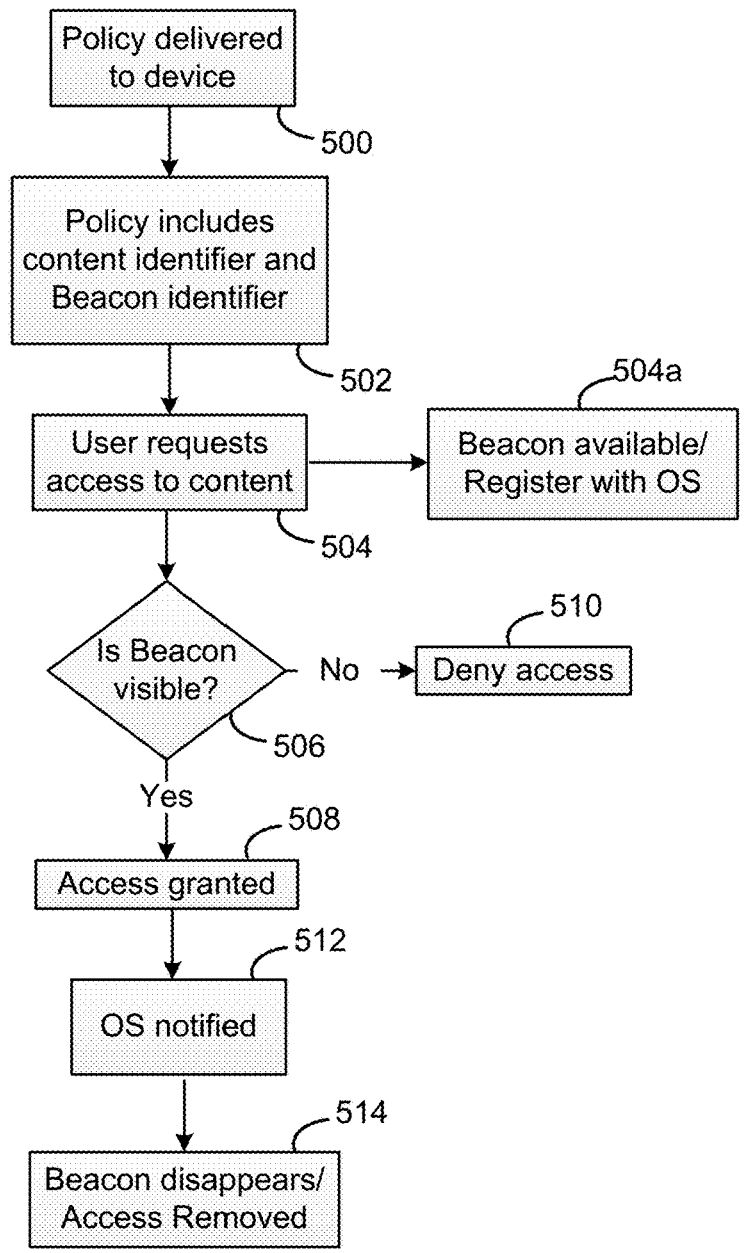
FIG. 5 is a diagrammatic flowchart illustrating a content access flow in accordance with the present disclosure.

For example, and referring now to FIG. 5, a policy may be delivered 500 to a mobile device. The policy may include 502 a content identifier and a beacon identifier. A user of the mobile device may request 504 access to content. The mobile device may determine 506 whether a beacon (e.g., with the proper beacon unique ID) is visible. If the beacon is visible, access to the content may be granted 508 and the operating system of the mobile device may be notified 512. If the beacon is not visible or disappears, access to the content may be removed 514.

In an implementation, the content access software may register for a specific beacon unique ID (or set of IDs) for specific content (e.g., a test or set of tests for students). When a beacon unique ID is detected by the OS, the content access software may be invoked and the content may be presented, for example, in the form of an online test for the user to take and submit answers.

In an embodiment, the mobile device may register (via, e.g., the OS or content access software) to detect when a specific beacon unique ID is no longer visible, present, or detectable. Referring to FIG. 5, the mobile device may determine whether the beacon (i.e., beacon unique ID) disappears or becomes undetectable, the access may be removed 514. In response to determining that at least one of the beacon device signal and a unique ID is not detectable at the client electronic device, content access process 12 may remove 218 access to the content at the client electronic device. For example, the beacon may be turned off or the user may leave the range of the beacon, and, in turn, the content would become in-accessible as a result. This action would be driven by policy. For example, in the test taking example, if the beacon is turned off or the user moves far enough away from the beacon, the test content will no longer be available (i.e., the test period is over). In an implementation, a policy may indicate that if a beacon is no longer available or in range of the mobile device, the content is still accessible but only for a specific period of time. For example, the content may be accessed for up to 4 hours after the beacon unique ID was last detected.

While various embodiments and implementations for providing access to content have been discussed in the context of broadcasting a beacon unique ID, other techniques and features may be achieved using the systems and methods described here and workflows may be realized. For example, beacons may be programmed with their own policies either by directly connecting them to a policy engine to receive policy or by sending the policy to the beacon a wireless or wired network connection.

In an implementation, one type of beacon-specific policy may include specifying that a beacon may only publish (i.e., broadcast or emit) its unique ID for a specific period of time (e.g., a date/time range). For example the beacon may only broadcast its unique ID during a specific test taking period. Further, the beacon may alter its unique ID based on a policy or schedule to enable the content which is accessible in a specific location to change based on the beacon changing its configuration based on the policy rules.

Using a beacon unique ID to enable content access may leave the beacon unique ID vulnerable to being captured by a third party. A third party may capture the beacon unique ID and create a malicious beacon which broadcasts the same beacon unique ID to enable content access (i.e., "spoofing"). To prevent such malicious activity, beacons may be placed in a sealed room which prevents electronic signals from leaking outside the room, such that the beacon signal cannot be captured by a third party outside the room. Thus, only mobile devices within the room would have access to the content based on that particular beacon unique ID. In addition, a corresponding policy constraint may be defined such that content available via that particular beacon unique ID may only be accessed while in the room, not walking by it, etc. This type of policy may enable scenarios such as accessing classified or trade-secret protected data only in one location.

Figure 6:
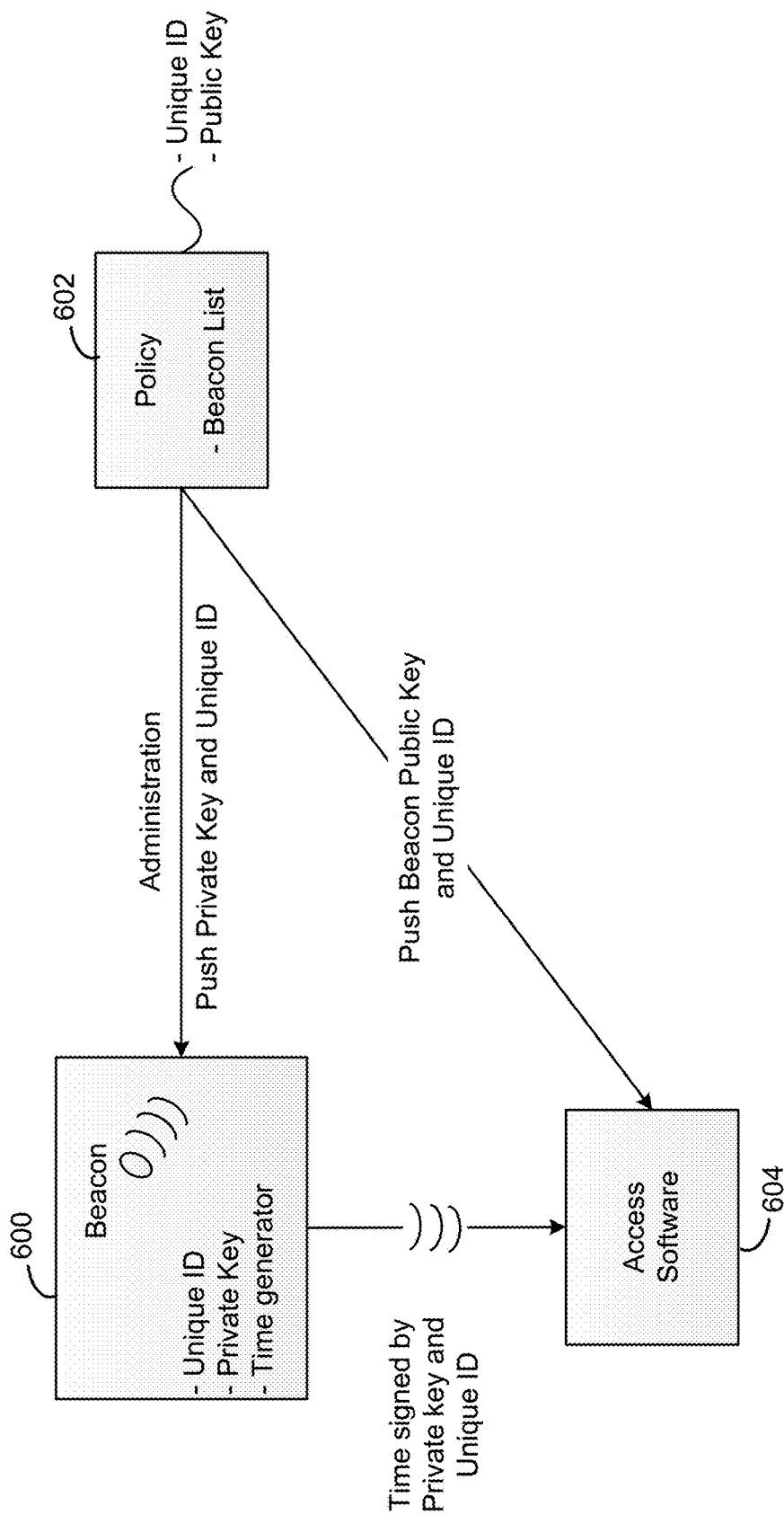
FIG. 6 is a diagram illustrating encryption aspects and features associated the present disclosure.

In an embodiment, supplemental encrypted keys may be added over time to prevent malicious activity such as spoofing. For example, and referring also to FIG. 6, the beacon 600 may be programmed to alter its unique ID according to a schedule defined by the policy engine or server 602. In an implementation, a beacon has a corresponding private key/public key pair. The private key may be installed or stored with the beacon 600 and the public key for the beacon may be stored at the policy engine or server 602. The beacon may be programmed to broadcast its unique ID but may also broadcast supplemental information. The supplemental information may include a timestamp encrypted by the private key. The public key for the beacon may be distributed to the content access software 604 (i.e., at the mobile device) via the policy engine or server 602 where it may be stored. For example, the beacon device may transmit a timestamp encrypted with the private key. The public key may have been pushed to the mobile device using the content access policy, such that the mobile device may verify that the timestamp was encrypted by the beacon device with the proper private key. In the public key infrastructure (PKI), if information is signed by a private key, then the corresponding public key may be used to decrypt the information and also to confirm the identity of who or what encrypted the information.

Further, when the content access software 604 determines that the mobile device is near the beacon 600 in question, it may read the supplemental encrypted timestamp and decrypt it using the public key it was given by the policy engine or server. If the decrypted timestamp is within a small window defined by the policy (e.g., 1-5 minutes), then the content access software may determine that the beacon is not being spoofed. In other words, the content access software 604 at the mobile device may determine whether the unique ID detected matched the particular beacon, validate the timestamp via the public key, and confirm the timestamp is in the acceptable range before allowing access to content.

Figure 7:
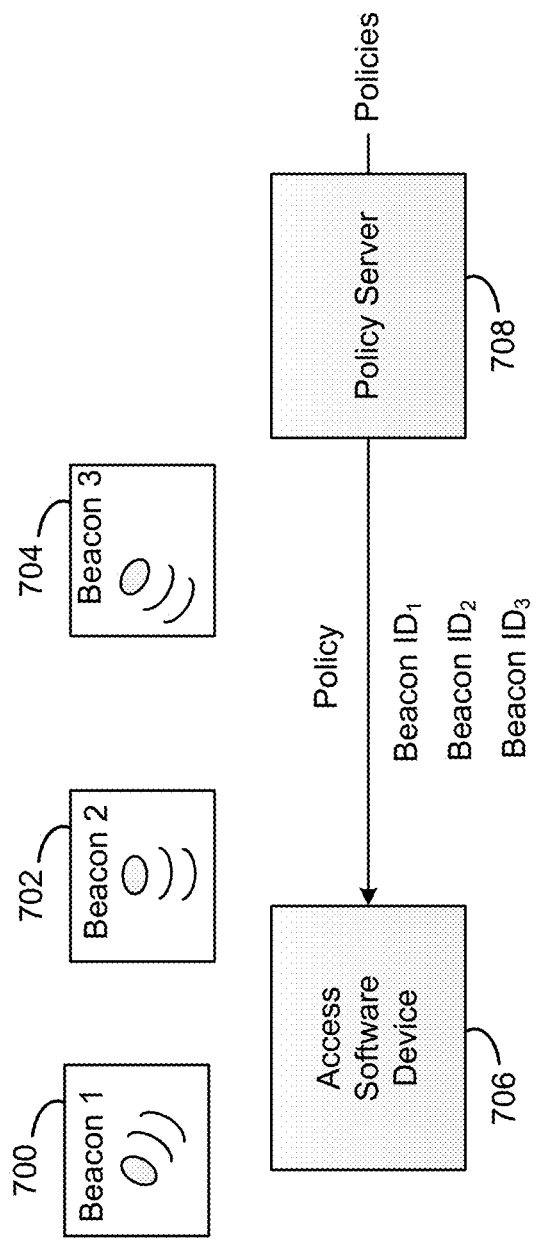
FIG. 7 is a diagram illustrating various implementations associated the present disclosure.

In an implementation, a plurality of beacons (i.e., beacon unique IDs) may be required to enable content access. A policy may be defined which requires a plurality of beacons (i.e., beacon unique IDs) to be present in order to grant access to content. For example, and referring now to FIG. 7, a policy may be defined such that two or more beacons (e.g., beacons 700, 702, 704) must be within the signal area (e.g., of the mobile device shown as access software device 706) before a file can be accessed. This policy may be enabled by using standard beacon unique IDs, or supplemental encrypted keys as discussed above for beacons. Thus, the policy engine or server 708 may send a content access policy to the mobile device where the content access policy requires detection of two or more beacon unique IDs at the mobile device before the content may be accessed.

Thus, in an implementation, content access process 12 may detect at the client electronic device, the presence of another beacon device signal emitted from another beacon device. Providing access to the content at the client electronic device may also be in response to detecting the presence of the other beacon device signal emitted from the other beacon device.

Figure 8:
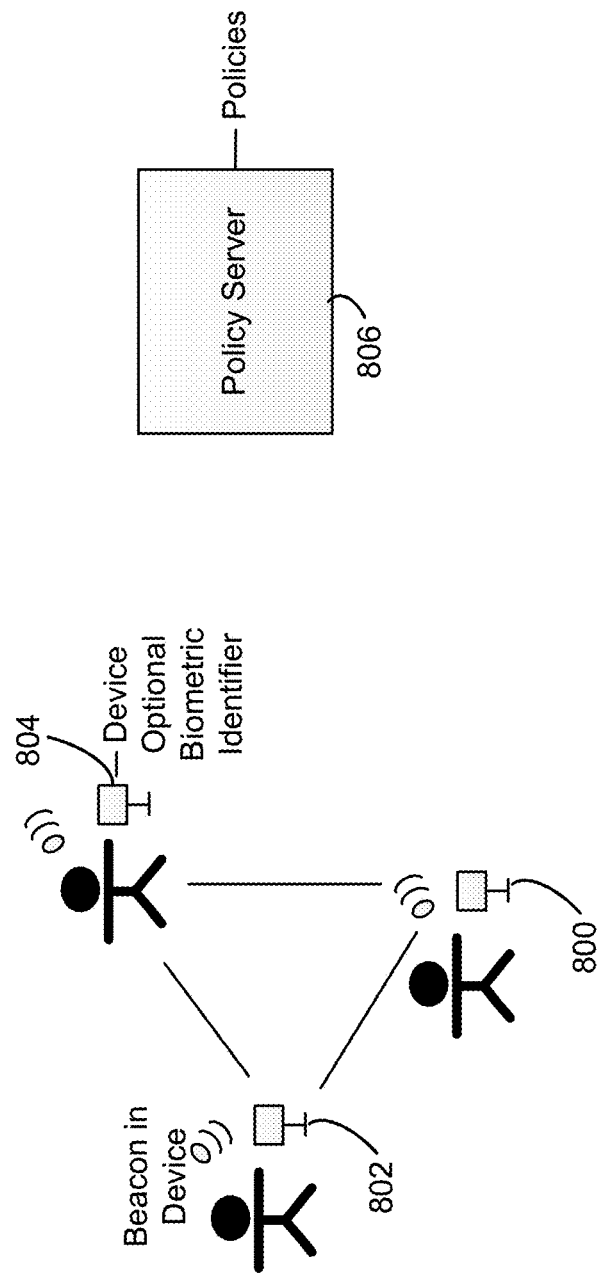
FIG. 8 is also a diagram illustrating various implementations associated with the present disclosure.

In an embodiment, the content access policy may require specific individuals to be in the same room to have access to content. This policy may be implemented via the requirement of a plurality of keys. For example, and referring now to FIG. 8, individual mobile devices (e.g., mobile devices 800, 802, 804) may be configured to be beacon emitters as if they are beacons devices such as those described above. As such, each user may have a unique ID which represents their mobile device. If the content access policy for those users requires each individual user's unique ID to be present for access to particular content, then the policy effectively requires each of a collection of users to be present for any of the users to have access to the content. In addition or alternatively, the policy may be defined (e.g., via policy server 806) such that majority of the users' unique IDs must be present before any one of the users are granted access to the content. In an implementation, the encrypted timestamp approach described above also may be applied to the collection of users scenario described here. In other words, each user may have their own private key to sign the timestamp in their signal and the server may have public keys for all users, which may be distributed with the content access policy.

Thus, in an implementation, content access process 12 may detect at the client electronic device, the presence of a client electronic device signal emitted from another client electronic device. Providing access to the content at the client electronic device may also be in response to detecting the presence of the client electronic device signal emitted from the other client electronic device. In an implementation, the beacon device may be another client electronic device, and the beacon device signal may be a client electronic device signal from the other client electronic device.

As a result, what is being checked by the content access software is that each user's device is present in the same location to gain access to the content. Such a policy may allow for malicious activity where each user's mobile device may be stolen to gain access to the content. This situation may be mitigated if each individual user's content access software or mobile device requires a form of bio-metric two-factor authentication to begin transmitting, such as a fingerprint verification or 2nd factor access code being entered into the software to ensure the user is physically present.

Further, in an implementation, beacons may be used not only to enable access to content but also to control what part of the content is accessible. Beacons may also be used to take the user directly to a portion of the content based on the particular beacons or a location determined based on triangulation of multiple beacons. For example, a policy may be defined to associate specific documents or subsections of a document with a given beacon unique ID. When that beacon comes into range (or has the strongest signal among a plurality of beacons), particular content associated with the beacon unique ID may be brought to the user. The above policies discussed regarding encryption and other features may be implemented individually or together.

For example, for a field aircraft maintenance worker, different beacons may be associated with different types of aircraft and/or content. If each aircraft is fitted with beacon transmitters coded for a particular aircraft type by the policy engine or server, then when a worker enables the mobile device, a content access software tool may detect which type of aircraft is closest, and may invoke or render repair documentation for that particular type of plane. In addition, or alternatively, a particular type of aircraft and/or location of the aircraft may be coded and multiple beacons may be places on or near the aircraft in different sections of the aircraft. As a maintenance worker moves around the aircraft, the content which will be presented to the maintenance worker on his/her mobile device will change (or the subsections will change) based on which part of the aircraft they are located in, as determined by the beacon signals. For example, the beacon which has the strongest signal relative to the maintenance worker's position on the aircraft may drive which content is displayed on the maintenance worker's mobile device. This example is not limited to the aircraft scenario, but could be any applied to any physical location or object such as a ship, train, or maintenance building with beacons attached (e.g., for training, maintenance, etc.).

Thus, in an implementation, content access process 12 may determine a first device proximity associated with the client electronic device based on the beacon device signal. Further, content access process 12 may render a first portion of the content at the client electronic device based on, at least in part, the first device proximity. Further, content access process 12 may detect, at the client electronic device, another beacon device signal emitted from another beacon device. Content access process 12 may determine a second device proximity associated with the client electronic device based on the other beacon device signal. Content access process 12 may render a second portion of the content at the client electronic device based on the second device proximity.

Further, the policy engine may also define what type of activity a user with the content access software should be doing (e.g., from pulling information from a separate work order system). When the mobile device user attempts to invoke access to particular content but the user is located in the wrong location to access the content, the content access software may warn the user or prevent the user from accessing the content.

In an implementation the policy may ties the presence of a specific beacon signal to a piece of content on the mobile device. As long as the beacon signal (e.g., unique ID) is present, the content may reside on the device. However, as soon as the beacon signal disappears, is not present, or is not detectable at the mobile device, then the OS may notify the content access software, and based on policy rules, the content may be "wiped" (e.g., deleted or removed), or "locked" until contact is established again with the policy server. For example, if a user has the mobile device but also a separate beacon on their person or nearby (e.g., in their car), then the user may gain access to particular content, but as soon as the user (or his/her mobile device) is separated from the beacon, the content may be wiped (i.e., removed or deleted). In this way the techniques and features used herein may be used to "handcuff" the content to a specific person carrying a device, or the content may be accessed only near a physical object like a vehicle.

While various real-world applications and scenarios have been discussed herein regarding implementing the techniques and features of the present disclosure, those applications and scenarios have been discussed for illustrative purposes only and are not intended to limit the present disclosure. For example, further applications and scenarios for implementing the techniques and features described herein may include implementations in the construction industry where construction plans may be shown on a mobile device based on a building the user is in or a location the user is in. Particular content to be displayed may be updated based on the stage of construction (e.g., beacons adjust what they broadcast from a location as construction proceeds).

Other implementations may be in the healthcare industry where particular content provided to a doctor or nurse is based on a particular room they are in. This policy may be combined with the need for the patient to be present (e.g., patient has a beacon signal generator on a wrist identifier). In an embodiment, home health care providers or visiting care providers may have content and forms they need to fill out displayed on a mobile device based on the provider being in a particular house they are visiting. The content access software may automatically fill out provider visit information and make sure the provider has the proper instructions and/or care procedures for the patient they are visiting.

Other implementations may be in the field sales industry where a sales person in a show room has content available to them adjusted automatically based on where the user is in the store or showroom. The content may be used for demonstrations using mobile devices. Other implementations may be in the manufacturing industry where quality inspection forms may be automatically filled out by location on an assembly line. For process work, items (e.g., cars) may be recognized and the content access software may initiate an automatic photo using a mobile device for quality control.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

In various embodiments, modules or software can be used to practice certain aspects of the invention. For example, software-as-a-service (SaaS) models or application service provider (ASP) models may be employed as software application delivery models to communicate software applications to clients or other users. Such software applications can be downloaded through an Internet connection, for example, and operated either independently (e.g., downloaded to a laptop or desktop computer system) or through a third-party service provider (e.g., accessed through a third-party web site). In addition, cloud computing techniques may be employed in connection with various embodiments of the invention. In certain embodiments, a "module" may include software, firmware, hardware, or any reasonable combination thereof.

Various embodiments of the systems and methods may include and/or utilize a computer device. In various embodiments, a computer may be in communication with a server or server system utilizing any suitable type of communication including, for example, wired or wireless digital communications. In some embodiments, the server or server system may be implemented as a cloud computing application or in a similar manner and may provide various functionality of the systems and methods as SaaS.

The examples presented herein are intended to illustrate potential and specific implementations of the present invention. The examples are intended primarily for purposes of illustration of the invention for those skilled in the art. No particular aspect or aspects of the examples are necessarily intended to limit the scope of the present invention.

The figures and descriptions of the present invention have been simplified to illustrate elements that are relevant for a clear understanding of the present invention, while eliminating, for purposes of clarity, other elements. Those of ordinary skill in the art may recognize, however, that these sorts of focused discussions would not facilitate a better understanding of the present invention, and therefore, a more detailed description of such elements is not provided herein.

The processes associated with the present embodiments may be executed by programmable equipment, such as computers. Software or other sets of instructions that may be employed to cause programmable equipment to execute the processes may be stored in any storage device, such as, for example, a computer system (non-volatile) memory, an optical disk, magnetic tape, or magnetic disk. Furthermore, some of the processes may be programmed when the computer system is manufactured or via a computer-readable memory medium.

It can also be appreciated that certain process aspects described herein may be performed using instructions stored on a computer-readable memory medium or media that direct a computer or computer system to perform process steps. A computer-readable medium may include, for example, memory devices such as diskettes, compact discs of both read-only and read/write varieties, optical disk drives, and hard disk drives. A computer-readable medium may also include memory storage that may be physical, virtual, permanent, temporary, semi-permanent and/or semi-temporary.

A "computer," "computer system," "component," "computer device," or "processor" may be, for example and without limitation, a processor, microcomputer, minicomputer, server, mainframe, laptop, personal data assistant (PDA), wireless e-mail device, cellular phone, pager, processor, fax machine, scanner, or any other programmable device configured to transmit and/or receive data over a network. Computer systems and computer-based devices disclosed herein may include memory for storing certain software applications used in obtaining, processing, and communicating information. It can be appreciated that such memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM) and/or other computer-readable memory media. In various embodiments, a "host," "engine," "loader," "filter," "platform," or "component" may include various computers or computer systems, or may include a reasonable combination of software, firmware, and/or hardware.

In various embodiments of the present invention, a single component may be replaced by multiple components, and multiple components may be replaced by a single component, to perform a given function or functions. Except where such substitution would not be operative to practice embodiments of the present invention, such substitution is within the scope of the present invention. Any of the servers, for example, may be replaced by a "server farm" or other grouping of networked servers (e.g., a group of server blades) that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand, and/or providing backup contingency in the event of component failure or reduction in operability.

In general, it may be apparent to one of ordinary skill in the art that various embodiments described herein, or components or parts thereof, may be implemented in many different embodiments of software, firmware, and/or hardware, or modules thereof. The software code or specialized control hardware used to implement some of the present embodiments is not limiting of the present invention. For example, the embodiments described hereinabove may be implemented in computer software using any suitable computer programming language such as .NET, SQL, MySQL, or HTML using, for example, conventional or object-oriented techniques. Programming languages for computer software and other computer-implemented instructions may be translated into machine language by a compiler or an assembler before execution and/or may be translated directly at run time by an interpreter.

Examples of assembly languages include ARM, MIPS, and x86; examples of high level languages include Ada, BASIC, C, C++, C#, COBOL, Fortran, Java, Lisp, Pascal, Object Pascal; and examples of scripting languages include Bourne script, JavaScript, Python, Ruby, PHP, and Perl. Various embodiments may be employed in a Lotus Notes environment, for example. Such software may be stored on any type of suitable computer-readable medium or media such as, for example, a magnetic or optical storage medium.

Thus, the operation and behavior of the embodiments are described without specific reference to the actual software code or specialized hardware components. The absence of such specific references is feasible because it is clearly understood that artisans of ordinary skill would be able to design software and control hardware to implement the embodiments of the present invention based on the description herein with only a reasonable effort and without undue experimentation.

Various embodiments of the systems and methods described herein may employ one or more electronic computer networks to promote communication among different components, transfer data, or to share resources and information. Such computer networks can be classified according to the hardware and software technology that is used to interconnect the devices in the network, such as optical fiber, Ethernet, wireless LAN, HomePNA, power line communication or G.hn. The computer networks may also be embodied as one or more of the following types of networks: local area network (LAN); metropolitan area network (MAN); wide area network (WAN); virtual private network (VPN); storage area network (SAN); or global area network (GAN), among other network varieties.

For example, a WAN computer network may cover a broad area by linking communications across metropolitan, regional, or national boundaries. As the systems and methods described herein aim to minimize I/O transactions, they may be useful in situations, such as cloud computing configurations, where I/O transactions are performed over a WAN or other network with long I/O delays. The network may use routers and/or public communication links. One type of data communication network may cover a relatively broad geographic area (e.g., city-to-city or country-to-country) which uses transmission facilities provided by common carriers, such as telephone service providers.

In another example, a GAN computer network may support mobile communications across multiple wireless LANs or satellite networks. In another example, a VPN computer network may include links between nodes carried by open connections or virtual circuits in another network (e.g., the Internet) instead of by physical wires. The link-layer protocols of the VPN can be tunneled through the other network. One VPN application can promote secure communications through the Internet. The VPN can also be used to separately and securely conduct the traffic of different user communities over an underlying network. The VPN may provide users with the virtual experience of accessing the network through an IP address location other than the actual IP address which connects the access device to the network.

The computer network may be characterized based on functional relationships among the elements or components of the network, such as active networking, client-server, or peer-to-peer functional architecture. The computer network may be classified according to network topology, such as bus network, star network, ring network, mesh network, star-bus network, or hierarchical topology network, for example. The computer network may also be classified based on the method employed for data communication, such as digital and analog networks.

Embodiments of the methods, systems, and tools described herein may employ internetworking for connecting two or more distinct electronic computer networks or network segments through a common routing technology. The type of internetwork employed may depend on administration and/or participation in the internetwork. Non-limiting examples of internetworks include intranet, extranet, and Internet. Intranets and extranets may or may not have connections to the Internet. If connected to the Internet, the intranet or extranet may be protected with appropriate authentication technology or other security measures. As applied herein, an intranet can be a group of networks which employ Internet Protocol, web browsers and/or file transfer applications, under common control by an administrative entity. Such an administrative entity could restrict access to the intranet to only authorized users, for example, or another internal network of an organization or commercial entity. As applied herein, an extranet may include a network or internetwork generally limited to a primary organization or entity, but which also has limited connections to the networks of one or more other trusted organizations or entities (e.g., customers of an entity may be given access an intranet of the entity thereby creating an extranet).

Computer networks may include hardware elements to interconnect network nodes, such as network interface cards (NICs) or Ethernet cards, repeaters, bridges, hubs, switches, routers, and other like components. Such elements may be physically wired for communication and/or data connections may be provided with microwave links (e.g., IEEE 802.12) or fiber optics, for example. A network card, network adapter or NIC can be designed to allow computers to communicate over the computer network by providing physical access to a network and an addressing system through the use of MAC addresses, for example. A repeater can be embodied as an electronic device that receives and retransmits a communicated signal at a boosted power level to allow the signal to cover a telecommunication distance with reduced degradation. A network bridge can be configured to connect multiple network segments at the data link layer of a computer network while learning which addresses can be reached through which specific ports of the network. In the network, the bridge may associate a port with an address and then send traffic for that address only to that port. In various embodiments, local bridges may be employed to directly connect local area networks (LANs); remote bridges can be used to create a wide area network (WAN) link between LANs; and/or, wireless bridges can be used to connect LANs and/or to connect remote stations to LANs.

In various embodiments, a hub may be employed which contains multiple ports. For example, when a data packet arrives at one port of a hub, the packet can be copied unmodified to all ports of the hub for transmission. A network switch or other devices that forward and filter OSI layer 2 datagrams between ports based on MAC addresses in data packets can also be used. A switch can possess multiple ports, such that most of the network is connected directly to the switch, or another switch that is in turn connected to a switch. The term "switch" can also include routers and bridges, as well as other devices that distribute data traffic by application content (e.g., a Web URL identifier or other data location information as described herein). Switches may operate at one or more OSI model layers, including physical, data link, network, or transport (i.e., end-to-end). A device that operates simultaneously at more than one of these layers can be considered a multilayer switch. In certain embodiments, routers or other like networking devices may be used to forward data packets between networks using headers and forwarding tables to determine an optimum path through which to transmit the packets.

As employed herein, an application server may be a server that hosts an API to expose business logic and business processes for use by other applications. Examples of application servers include J2EE or Java EE 5 application servers including Web Sphere Application Server. Other examples include Web Sphere Application Server Community Edition (IBM), Sybase Enterprise Application Server (Sybase Inc), WebLogic Server (BEA), JBoss (Red Hat), JRun (Adobe Systems), Apache Geronimo (Apache Software Foundation), Oracle OC4J (Oracle Corporation), Sun Java System Application Server (Sun Microsystems), and SAP Netweaver AS (ABAP/Java).

Also, application servers may be provided in accordance with the .NET framework, including the Windows Communication Foundation, .NET Remoting, ADO.NET, and ASP. NET among several other components. For example, a Java Server Page (JSP) is a servlet that executes in a web container which is functionally equivalent to CGI scripts. JSPs can be used to create HTML pages by embedding references to the server logic within the page. The application servers may mainly serve web-based applications, while other servers can perform as session initiation protocol servers, for instance, or work with telephony networks. Specifications for enterprise application integration and service-oriented architecture can be designed to connect many different computer network elements. Such specifications include Business Application Programming Interface, Web Services Interoperability, and Java EE Connector Architecture.

In various embodiments, the computer systems, data storage media, or modules described herein may be configured and/or programmed to include one or more of the above-described electronic, computer-based elements and components, or computer architecture. In addition, these elements and components may be particularly configured to execute the various rules, algorithms, programs, processes, and method steps described herein.

Implementations of the present disclosure and all of the functional operations provided herein can be realized in digital electronic circuitry, or in computer software, firmware, or hardware, including the structures disclosed in this specification and their structural equivalents, or in combinations of one or more of them. Implementations of the disclosure can be realized as one or more computer program products, i.e., one or more modules of computer program instructions encoded on a computer readable medium for execution by, or to control the operation of, a data processing apparatus. The computer readable medium can be a machine-readable storage device, a machine readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions or computer program products and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. These may also be referred to as computer readable storage media. The processor and the memory can be supplemented by, or incorporated in, special purpose logic circuitry.

To provide for interaction with a user, implementations of described herein can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations of the present disclosure can be realized in a computing system that includes a back end component, e.g., as a data server, or that includes a middleware component, e.g., an application server, or that includes a front end component, e.g., a client computer having a graphical user interface or a Web browser through which a user can interact with an implementation of the present disclosure, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this disclosure contains many specifics, these should not be construed as limitations on the scope of the disclosure or of what may be claimed, but rather as descriptions of features specific to particular implementations of the disclosure. Certain features that are described in this disclosure in the context of separate implementations can also be provided in combination in a single implementation. Conversely, various features that are described in the context of a single implementation can also be provided in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

While various embodiments have been described herein, it should be apparent, however, that various modifications, alterations and adaptations to those embodiments may occur to persons skilled in the art with the attainment of some or all of the advantages of the invention. The disclosed embodiments are therefore intended to include all such modifications, alterations and adaptations without departing from the scope and spirit of the invention. Accordingly, other embodiments and implementations are within the scope of the following claims. For example, the actions recited in the claims can be performed in a different order and still achieve desirable results.

What is claimed is:

1. A method for controlling access to content, the method comprising:
    selecting a location for distributing content, wherein the content is relevant to an activity at the location;
    attaching a beacon device at the location, wherein the beacon device has a signal range within the location, wherein the beacon device signal comprises a unique beacon ID which is detectable at the client electronic device and usable to determine whether the content is accessible from the client electronic device;
    detecting, at a client electronic device, the presence of a beacon device signal emitted from the beacon device, wherein the client device is a mobile device;
    determining, based on the beacon device signal, whether the content is accessible from the client electronic device, wherein determining whether the content is accessible from the client electronic device is further based on a content access policy set at a policy server and wherein a level of access to the content is based upon the content access policy and whether the content is accessible by the client electronic device based on whether the unique beacon ID detected by content access module running on client electronic device matches that of the beacon device, validating timestamp beacon device using a public key, and confirming the timestamp is in an acceptable range before allowing access to content on mobile device;

transmitting private key and unique identifier, using policy server, to beacon device;

transmitting, from the policy server, the public key to the client electronic device; and in response to determining that the content is accessible from the client electronic device, providing access to the content at the client electronic device.

2. The method of claim 1, wherein determining whether the content is accessible from the client electronic device is further based on a content access policy set at a policy server and wherein a level of access to the content is based upon the content access policy.

3. The method of claim 1, further comprising:
receiving a content access policy at the client electronic device; and
wherein the determining whether the content is accessible from the client electronic device is further based on the content access policy and the determining is performed without the client electronic device being in communication with the policy server from which the content access policy was received.

4. The method of claim 1, wherein providing access to the content at the client electronic device comprises at least one of:
receiving the content at the client electronic device in response to determining that the content is accessible from the client electronic device; and
pre-loading the content on the client electronic device prior to determining that the content is accessible and unlocking the content on the client electronic device in response to determining that the content is accessible from the client electronic device using a decrypted timestamp.

5. The method of claim 1, wherein the beacon device is a Bluetooth Low Energy device.

6. The method of claim 1, wherein the beacon device signal comprises the unique ID which is detectable at the client electronic device and usable to determine whether the content is accessible from the client electronic device.

7. The method of claim 1, further comprising:
in response to determining that the content is accessible from the client electronic device, decrypting the content such that the content is accessible from the client electronic device, wherein the location is a testing room and the content is a test.

8. The method of claim 1, further comprising:
in response to determining that at least one of the beacon device signal and the unique ID is not detectable at the client electronic device, removing access to the content at the client electronic device.

9. The method of claim 8, wherein access to the content at the client electronic device is removed after a delay based on content access policy.

10. The method of claim 3, wherein the content access policy includes at least one of:

an indication of one or more users having access to the content based on detecting the presence of a beacon device signal emitted from a particular beacon device;
an indication of a level of access to the content for each of the one or more users; and
an encryption key usable to access the content.

11. The method of claim 1, further comprising:
detecting, at the client electronic device, the presence of another beacon device signal emitted from another beacon device; and
wherein providing access to the content at the client electronic device is also in response to detecting the presence of the other beacon device signal emitted from the other beacon device.

12. The method of claim 1, further comprising:
detecting, at the client electronic device, the presence of a client electronic device signal emitted from another client electronic device; and
wherein providing access to the content at the client electronic device is also in response to detecting the presence of the client electronic device signal emitted from the other client electronic device.

13. The method of claim 1, wherein the beacon device is another client electronic device, and the beacon device signal is a client electronic device signal from the other client electronic device.

14. The method of claim 1, further comprising:
determining a first device proximity associated with the client electronic device based on the beacon device signal; and
rendering a first portion of the content at the client electronic device based on, at least in part, the first device proximity.

15. The method of claim 14, further comprising:
detecting, at the client electronic device, another beacon device signal emitted from another beacon device;
determining a second device proximity associated with the client electronic device based on the other beacon device signal; and
rendering a second portion of the content at the client electronic device based on the second device proximity.

16. The method of claim 1, further comprising:
controlling one or more features available from a client application for accessing the content based on at least one of the proximity of the beacon device to the client electronic device and the content access policy.

17. The method of claim 13, further comprising:
requiring two-factor authentication to verify that a specific user is in a room where the beacon device is present prior to providing access to the content.

18. The method of claim 1, further comprising:
handcuffing the content to the client electronic device based on the presence of a beacon device.

19. A method for controlling access to content, the method comprising:
attaching a beacon device at a location wherein secure content is selectively distributed, wherein the beacon device has a signal range within the location;
receiving, from a policy server, a content access policy at the beacon device;
emitting, from the beacon device, a beacon device signal representative of at least a portion of the content access policy and a unique beacon ID;
storing a private key at the beacon device and a corresponding public key at the policy server; and
transmitting, from the policy server, the public key to the client electronic device, wherein the private key is used to encrypt information from the beacon device which is used by the client electronic device to confirm the identity of the beacon device to prevent spoofing;

transmitting the encrypted information, wherein the encrypted information comprises a time stamp; and wherein the beacon device signal is receivable by a client electronic device and usable by the client electronic device to provide access to the content based on a presence of the beacon device signal, wherein the client device is a mobile device, wherein the mobile device is running a content access module that determines whether the content is accessible by the mobile device based on whether the unique beacon ID detected by content access module matches that of the beacon device, validating timestamp from beacon device using the public key, and confirming the timestamp is in an acceptable range before allowing access to content on mobile device, wherein the content is relevant to an activity at the location.

20. The method of claim 19, wherein the beacon device signal further comprises a unique ID emitted based on time and date provisions of the content access policy, and wherein access to the content from the client electronic device is provided or removed based on a presence of the unique ID.

21. The method of claim 19, wherein the unique ID is altered to correspond to particular content accessible by the client electronic device based on the content access policy, and wherein the particular content accessible by the client electronic device changes based on the altering of the unique ID.

22. The method of claim 19, further comprising:

requiring two-factor authentication to verify that a specific user is in a room where the beacon device is present prior to providing access to the content.

23. The method of claim 19, wherein the policy server is linked to a business specific system or server used, in part, to determine the content access policy.

24. The method of claim 19, wherein the beacon device is located in a sealed room which prevents the beacon unique ID from leaving the sealed room to prevent spoofing.

25. A system for controlling access to content, the system comprising:

at least one beacon device that emits a beacon device signal comprising a unique ID, wherein the beacon device signal has a ranged sized for a room, the at least one beacon device configured to attach to a position in the room;

at least one client electronic device configured to receive the beacon device signal, a content access policy, and the content, wherein the content is selected for an activity specific to the room;

a content access module running at the at least one client electronic device that determines whether the content is accessible by the at least one client electronic device based on whether the unique ID detected by content access module matches that of the at least one beacon device, validating a timestamp from beacon device using the beacon public key, and confirming the timestamp is in an acceptable range before allowing access to content;

a policy server that provides the content access policy to the at least one client electronic device, wherein the policy server pushes a private key and the unique ID to the beacon device; and a content repository that provides the content to the client electronic device, wherein the content is not accessible until the client electronic device is in the room, wherein the content access module receives the beacon public key and the unique ID.

* * * * *